United States Patent [19]
Furuya

[11] Patent Number: 5,618,392
[45] Date of Patent: Apr. 8, 1997

[54] GAS DIFFUSION ELECTRODE

[75] Inventor: Nagakazu Furuya, No. 2-14, Nakamuramachi, Kofu-shi, Yamanashi, Japan

[73] Assignees: Tanaka Kikinzoku Kogyo K.K.; Nagakazu Furuya, both of Japan

[21] Appl. No.: 421,840

[22] Filed: Apr. 13, 1995

Related U.S. Application Data

[63] Continuation-in-part of Ser. No. 969,089, Oct. 30, 1992, abandoned.

[30] Foreign Application Priority Data

| Oct. 31, 1991 | [JP] | Japan | 3-314086 |
| Nov. 29, 1991 | [JP] | Japan | 3-340347 |
| Feb. 28, 1992 | [JP] | Japan | 4-78597 |
| Feb. 28, 1992 | [JP] | Japan | 4-78598 |

[51] Int. Cl.$^6$ ............... C25B 9/00; H01M 4/86
[52] U.S. Cl. ............ 204/252; 204/284; 204/290 R; 204/242; 429/40; 429/41; 429/42
[58] Field of Search ............... 204/284, 290 R, 204/252, 242; 429/40, 41, 42

[56] References Cited

U.S. PATENT DOCUMENTS

| 4,260,469 | 4/1981 | McIntyre et al. | 204/265 |
| 4,444,852 | 4/1984 | Liu et al. | 429/29 |
| 4,748,095 | 5/1988 | Furuya et al. | 429/101 |
| 4,931,168 | 6/1990 | Watanabe et al. | 204/204 |
| 5,149,414 | 9/1992 | Chiang et al. | 204/294 |

*Primary Examiner*—Bruce F. Bell
*Attorney, Agent, or Firm*—Klauber & Jackson

[57] ABSTRACT

Disclosed herein is a gas diffusion electrode comprising a reaction layer and a gas diffusion layer attached to each other characterized in that a plurality of apertures or a concave convex surface is provided on or through the electrode to facilitate the flowing of an electrolyte. In this electrode, a large volume of an electrolyte and a gas can flow even though the interelectrode distance is small so that a reaction can be promoted to elevate the efficiency.

9 Claims, 6 Drawing Sheets

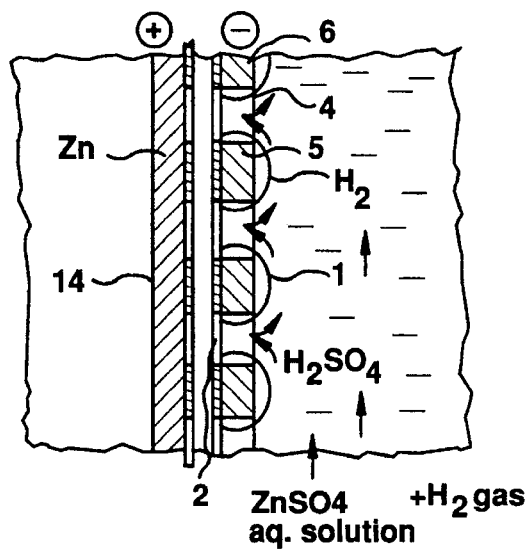
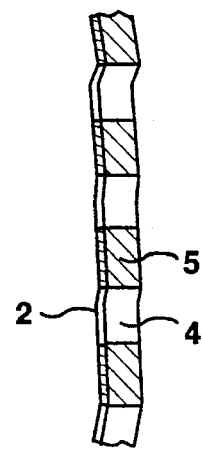
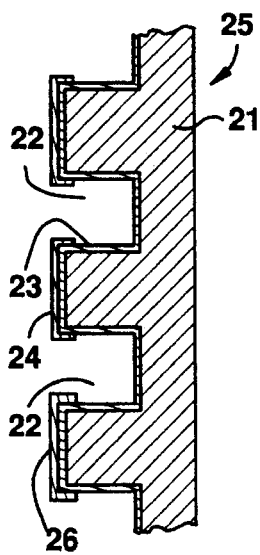
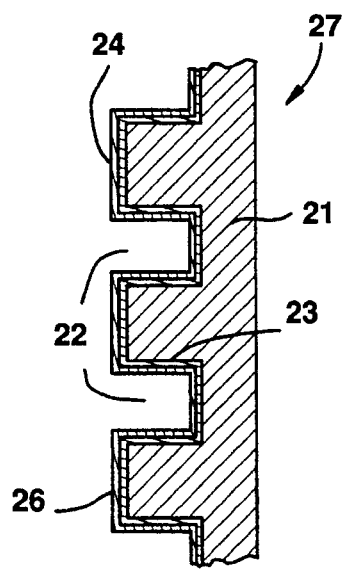

GAS DIFFUSION ELECTRODE

CROSS-REFERENCE TO RELATED APPLICATION

This application is a continuation-in-part of application Ser. No. 07/969,089 filed Oct. 30, 1992, now abandoned. Said Ser. No. 07/969,089 claims the priority, under 35 U.S.C. § 119, of Japanese Patent Applications Nos. 3-314086; 3-340347; 4-078597; and 4-078598 and certified copies of the aforesaid Japanese applications are in the file of Ser. No. 07/969,089.

BACKGROUND OF THE INVENTION

The present invention relates to a gas diffusion electrode which may be used in a fuel cell or electrochemical reactor or in electrolysis or electroplating processes.

A conventional gas diffusion electrode consists of a reaction layer and a gas diffusion layer joined with each other (e.g. see U.S. Pat. Nos. 4,931,168 and 4,748,095). The reaction layer consists of hydrophilic portions having fine passages through which a liquid can permeate; hydrophobic portions having fine passages through which a gas can pass, with the separate portions being mixed and contacted with each other; and a catalyst supported on the hydrophilic portions. The gas diffusion layer consists of hydrophobic portions containing fine passages through which a gas can pass. The gas diffusion electrode is utilized while an electrolyte is retained at the reaction layer side and a gas passes at the gas diffusion layer side.

If the interelectrode distance (the distance between an anode and a cathode) of the gas diffusion electrode is large, the electrical resistance increases such that the energy efficiency decreases. However, when the interelectrode distance is small, flow of the electrolyte is difficult to control thereby resulting in a decrease in energy efficiency.

An ion exchange membrane may be located between the electrodes, depending on the type of electrolysis process for which the gas diffusion electrode will be utilized. In the interelectrode distance is made smaller, then the distances between the ion exchange membrane and the electrodes are smaller, thereby decreasing the volume of the electrolyte flowing therebetween and resulting in decreased energy efficiency.

SUMMARY OF THE INVENTION

It has been found that the present invention overcomes the above disadvantages.

An object of the present invention is to provide a gas diffusion electrode attaining a high energy efficiency.

Another object is to provide a gas diffusion electrode in which a large volume of an electrolyte can flow through the electrode even if the interelectrode distance is reduced.

The present invention relates to a gas diffusion electrode comprising a reaction layer and a gas diffusion layer attached to one another, wherein a plurality of apertures or a concave-convex surface is provided on or through the electrode to facilitate the flow of an electrolyte.

One aspect of the present invention relates to a gas diffusion electrode in which a plurality of apertures are provided through the reaction layer, comprising fine hydrophilic portions through which a liquid can permeate; and fine hydrophobic portions through which a gas can pass, the two portions being mixed and in contact with one another.

In the gas diffusion electrode of the present invention, the catalyst may be supported on the reaction layer. Further, the gas diffusion layer may possess the same number of apertures, at the same locations as those of the reaction layer. A current collector may be joined to or embedded in the gas diffusion electrode. In addition, a porous member made of fluorine-containing resin may be attached to a part of the gas diffusion electrode.

Since a plurality of apertures or concave-convex surfaces having a diameter of at least 2 mm are provided on or through the gas diffusion electrode of the present invention, the free flow of a fluid electrolyte is facilitated, when the gas diffusion electrode is immersed in the electrolyte, i.e. the electrolyte and a gas can flow at the rear side of the electrode to reach and to be absorbed in the hydrophilic portions of the reaction layer, in the hydrophobic portions of the reaction layer and in the gas diffusion layer attached to the reaction layer, even though interelectrode distance is small, such that the electrochemical reaction is promoted so as to result in an increase in the energy efficiency. Accordingly, even when an electrolyzer, a fuel cell, electroplating apparatus and the like is designed to be of a relatively large size, the employment of a large apparatus is not required. Of course, if a large size apparatus is nevertheless employed, the capacity of the apparatus can be further increased.

A second aspect of the invention is a gas diffusion electrode in which a gas diffusion layer, having fine hydrophobic apertures through which a gas can pass, is attached to the entire surface of an electroconductive member, forming a plurality of concave-convex portions; and a reaction layer containing fine hydrophilic apertures, through which a liquid can pemaeate, and fine hydrophobic apertures through which a gas can pass, is attached to the entire surface, or to part of the surface, other than the convex portions of the gas diffusion layer.

A third aspect of the invention relates to a gas diffusion electrode comprising an electroconductive member having large apertures (i.e. diameters of at least 2 mm), a part of which is fine hydrophobic portions through which a gas and a liquid can pass, is attached to the reaction layer which is comprised of fine hydrophilic portions and fine hydrophobic portions being mixed and in contact with one another.

Since the gas diffusion electrode of the invention comprises the electroconductive member with large apertures (i.e. having diameters of at least 2 mm), a part of which is fine hydrophobic portions, through which a gas can pass, is attached to the reaction layer, and the gas may be absorbed in the hydrophobic portions of the reaction layer, a large volume of an electrolyte and a gas can readily flow through the electrode, thereby promoting the electrochemical reaction and increasing the energy efficiency.

Another aspect of the invention is a gas diffusion electrode in which a current collector is located at the center of a reaction layer, comprising fine hydrophilic portions through which a liquid electrolyte can permeate and fine hydrophobic portions through which a gas can pass. The two portions are mixed and contacted with each other, with an electrical-insulating hydrophilic porous layer and an electric insulating hydrophobic porous layer being attached to both surfaces of the reaction layer. This gas diffusion electrode does not contain a gas diffusion layer.

Since, in the gas diffusion electrode which does not contain a gas diffusion layer, the electrical-insulating hydrophilic porous layer is attached to one surface of the reaction layer, the electrolyte permeating the electrical-insulating hydrophilic porous layer cannot move by means of convection but can move only by diffusion when the gas diffusion electrode is employed as a cathode. In such a situation, the electrolyte containing the metal ion which is oxidized in the anode side is not supplied to the reaction layer. Accordingly, no metal ions are reduced on the cathode.

The hydrogen ion passes through the electrical-insulating hydrophilic porous layer, having higher permeability, without interruption against the movement to the cathode, to be progressively reduced to a hydrogen gas by means of the current collector in the hydrophilic portions of the reaction layer. The hydrogen gas is evolved from the hydrophobic portions of the reaction layer and the electrical-insulating hydrophilic porous layer located at the other surface of the reaction layer.

The porosity of the porous layers is preferably greater than 60% for suppressing the loss of electrical power due to electrical resistance during the electrolysis process. The pore size of the porous layers is preferably less than 10 μm for the purpose of moving the electrolyte only by diffusion.

BRIEF DESCRIPTION OF THE DRAWINGS

FIG. 6 is a schematic sectional view showing the gas diffusion electrode of FIG. 2 employed in electroplating;

FIG. 7 is a sectional view exemplifying the modification of apertures;

FIG. 8 is a partially enlarged sectional view of a fourth embodiment of the gas diffusion electrode in accordance with the present invention;

FIG. 9 is a partially enlarged sectional view of a fifth embodiment of the gas diffusion electrode in accordance with the present invention;

DETAILED DESCRIPTION OF THE INVENTION

Various embodiments of the present invention will be described referring to the annexed drawings.

Figure 1:
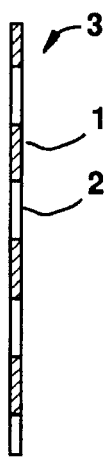
FIG. 1 is a partially enlarged sectional view of a first embodiment of the gas diffusion electrode in accordance with the present invention.

FIG. 1 shows a first embodiment of the gas diffusion electrode of the invention wherein reaction layer 1 comprises first fine hydrophilic portions through which a liquid can permeate and second fine hydrophobic portions through which a gas can pass, with both portions being mixed and in contact with each other. The first portions contain hydrophilic carbon black, hydrophobic carbon black and polytetrafluoroethylene (hereinafter referred to as "PTFE"), and the second portions contain hydrophobic carbon black and PTFE. A plurality of circular apertures 2 are provided through the reaction layer 1 in the form of a zigzag.

The reaction layer 1 of a gas diffusion electrode 3 having this structure may possess a catalyst such as a platinum group metal, its oxide or a platinum group metal alloy supported thereon.

Figure 2:
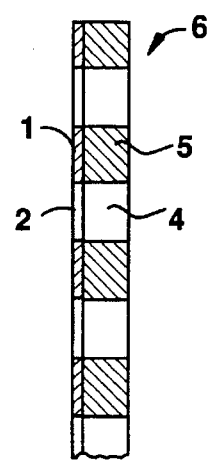
FIG. 2 is a partially enlarged sectional view of a second embodiment of the gas diffusion electrode in accordance with the present invention.

In FIG. 2 which shows a second embodiment of the gas diffusion electrode of this invention, reference numeral 1 designates the same reaction layer as that of FIG. 1, to which a gas diffusion layer 5, having the same number of apertures at the same locations as those of reaction layer 1 and consisting of finely dispersed hydrophobic portions made of hydrophobic carbon black and PTFE through which a gas can pass, is attached, to constitute a gas diffusion electrode 6.

The reaction layer 1 of gas diffusion electrode 6 having such structure may possess a catalyst such as a platinum group metal its oxide or a platinum group metal supported thereon.

Figure 3:
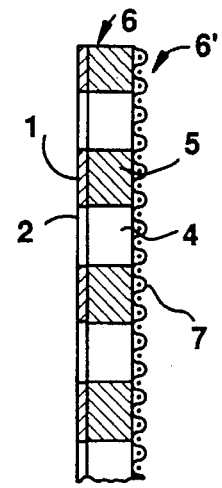
FIG. 3 is a partially enlarged sectional view of a third embodiment of the gas diffusion electrode in accordance with the present invention.

In FIG. 3 which shows a further embodiment of the gas diffusion electrode of this invention, reference numeral 6 designates the same gas diffusion electrode as that of FIG. 2. A mesh-like current collector 7 is attached to the gas diffusion layer 5 of the gas diffusion electrode 6 to constitute a gas diffusion electrode 6' equipped with the current collector 7. A part of the gas diffusion layer 5 may be made hydrophobic by spraying PTFE dispersion thereon.

A typical process of employing these gas diffusion electrodes will be described, referring to the gas diffusion electrode 6 of FIG. 2 (a Pt catalyst is supported on reaction layer 1).

In the case of electrolysis (FIG. 4), a cation exchange membrane 10 is located between and close to the two gas diffusion electrodes 6 employed as an anode and a cathode.

Accordingly, when a sodium chloride aqueous solution and hydrogen gas are supplied to the anode chamber and a sodium hydroxide aqueous solution and oxygen gas are supplied to the cathode chamber, the hydrogen gas is captured on the surface of the gas diffusion layer 5 located at the rear of the anode, and the oxygen gas is captured on the surface of the gas diffusion layer 5 located at the rear of the cathode, even though the distances between the cation exchange membrane 10 and both electrodes are small such that the gases readily reach to the reaction layers 1. The sodium chloride solution is supplied to the reaction layer 1 through aperture 4 of the gas diffusion layer 5 and aperture 2 of reaction layer 1, and a sodium ion is passed through cation exchange membrane 10 by electrolysis reacts with a hydroxyl ion to produce sodium hydroxide. The sodium hydroxide passes through the apertures 2, 4 to the electrolyte side, thereby promoting the reaction. Even through the interelectrode distance is small, a large volume of the electrolyte and the gases can flow in this manner to facilitate the mass transfer such that the electrolysis and may be conducted at a higher efficiency to elevate the energy efficiency.

Figure 5:
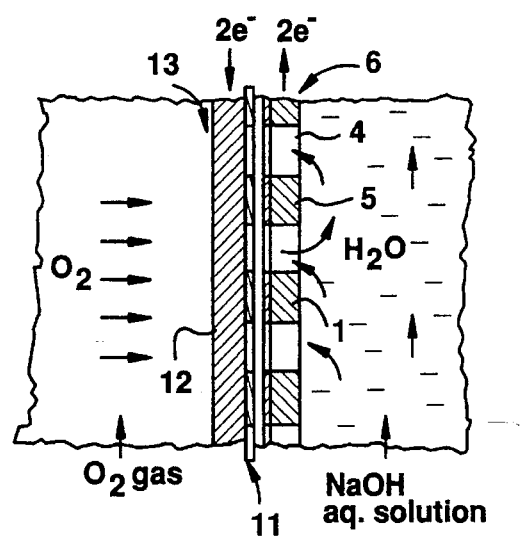
FIG. 5 is a schematic sectional view showing the gas diffusion electrode of FIG. 2 employed in a sulfuric acid-type fuel cell.

In the case of a sulfuric acid-type fuel cell (FIG. 5), a first gas diffusion electrode 13 consisting of a reaction layer 11 and a gas diffusion layer 12, neither having any apertures, are located in a gas chamber as an oxygen electrode, and a second gas diffusion electrode 6 which is the same as that of FIG. 2 (a platinum catalyst is supported on reaction layer 1) is located close to the first gas diffusion electrode 13 in a liquid chamber as a hydrogen electrode. The oxygen gas in the gas chamber diffuses into the gas diffusion layer 12 of the gas diffusion electrode 13 to reach the hydrophobic portions of reaction layer 11 to be reacted by means of the platinum catalyst with sulfuric acid permeated into the hydrophilic portions of reaction layer 11 from the liquid chamber, to generate electricity through electron transfer. A separator such as a thin glass filter is preferably present in the liquid chamber.

On the other hand, the hydrogen gas supplied to the liquid chamber passes through apertures 4 from the rear side of gas diffusion electrode 6 to diffuse into gas diffusion layer 5 to reach the hydrophobic portions of reaction layer 1. The hydrogen gas is reacted by means of the platinum catalyst with sulfuric acid which has permeated into the hydrophilic portions of reaction layer 1 to generate electricity through electron transfer. In this fuel cell, the sulfuric acid aqueous solution can readily pass to the rear side of the hydrogen electrode even though the distance between the oxygen electrode and the hydrogen electrode is small such that the cell can be cooled by circulating the aqueous sulfuric acid solution, thereby eliminating the need for separate cooling means for removing the heat of a conventional cell. Moreover, the energy efficiency can be increased since the interelectrode distance can be made smaller.

In the case of electroplating (FIG. 6), a substance 14 to be plated and gas diffusion electrode 6 are located as a cathode and an anode, respectively, close to one another. When an electrolytic cell is filled with a zinc sulfate aqueous solution and hydrogen gas and electricity is supplied to the cell, the zinc sulfate aqueous solution readily moves to the rear side of gas diffusion electrode 6 to pass through apertures 4 of the gas diffusion electrode 5 and the aperture 2 of reaction layer 1 to be absorbed in the hydrophilic portions of reaction layer 1. Even though the distance between the gas diffusion electrode 6 and the substance 14 is small, the hydrogen gas passes through aperture 4 to be absorbed in gas diffusion layer 5 to reach the hydrophobic portions of the reaction layer to eventually produce sulfuric acid, as a result of the platinum catalyst. The hydrogen gas is oxidized and zinc is plated on substance 14. Hydrogen gas is evolved on substance 14 which functions as a cathode, and is absorbed in gas diffusion layer 5 through apertures 2, 4. Accordingly, the hydrogen gas can be captured and saved. Moreover, the electrolyte can readily move to the rear side of the gas diffusion electrode even though the interelectrode distance is small so that the $Zn^{+2}$ ion can be easily supplied to efficiently carry out the electroplating at a higher energy efficiency.

The shape of the apertures of the gas diffusion electrode of the present invention is not limited to a circular shape and the aperture may have any other desired shape such as an angular one. Moreover, their arrangement is not limited to that of a zigzag pattern, but may be in any other pattern desired. Additionally, as shown in FIG. 7, the immediate area surrounding apertures 2, 4 may be slightly inclined to alter the flow of the electrolyte and the gas so as to provide more contact therebetween.

In FIG. 8, reference numeral 21 denotes an electroconductive porous member containing on one surface thereof, a plurality of concave portions (i.e. concave grooves) 22. A gas diffusion layer 23 prepared from hydrophobic carbon black and PTFE and having hydrophobic fine apertures dispersed therein through which a gas may pass, is tightly attached to the entire surface containing concave grooves 22. A reaction layer 24 made of hydrophilic carbon black, hydrophobic carbon black and PTFE intermixed and in contact with each other, and having hydrophilic fine apertures through which a liquid can permeate and hydrophobic fine apertures dispersed therein through which a gas may pass, is attached to surfaces other than concave grooves 22, that is, to the upper surfaces of convex portions 26.

Reaction layer 24 of gas diffusion electrode 25 having such structure may possess a catalyst such as a platinum group metal a platinum group metal oxide or a platinum group metal alloy supported thereon.

FIG. 9 shows a further embodiment of the present invention, wherein reaction layer 24 is also attached to an inner surface of concave grooves 22, in addition to the surface other than the concave grooves 22 that is, to the whole surface of gas diffusion layer 23.

Reaction layer 24 of gas diffusion electrode 26 having such structure may possess a catalyst such as a platinum group metal, a platinum group metal oxide or a platinum group metal alloy supported thereon.

A typical process of employing these gas diffusion electrodes will be described referring to gas diffusion electrode 25 of FIG. 8 (a platinum catalyst is supported on reaction layer 24).

In the case of electrolysis (FIG. 10), a cation exchange membrane 28 is installed between and close to the two gas diffusion electrodes 25 employed as an anode and a cathode. When a sodium chloride aqueous solution is supplied to the anode chamber and a mixed flow of a sodium hydroxide aqueous solution and oxygen gas is supplied to the cathode chamber, the oxygen gas is captured in the hydrophobic apertures of gas diffusion layer 23 of concave grooves 22 even though the distances between cation exchange membrane 28 and both electrodes are small. The oxygen gas can easily migrate in the gas diffusion layer 23 and in the electroconductive porous member to be supplied to reaction layer 24 to be reduced to OH⁻. The Na⁺, having permeated the cation exchange membrane, reacts with OH⁻ to produce NaOH, but the increase in concentration is small inasmuch as the electrolyte readily flows in concave grooves 22. Chlorine gas evolved on the anode is discharged through electroconductive porous member 21. Even though the interelectrode distance is small, a large volume of electrolyte and the gases can flow in this manner to facilitate the mass transfer required for promoting the reaction such that the electrolysis may be conducted at a higher level of efficiency, thereby raising the energy efficiency level.

Figure 11:
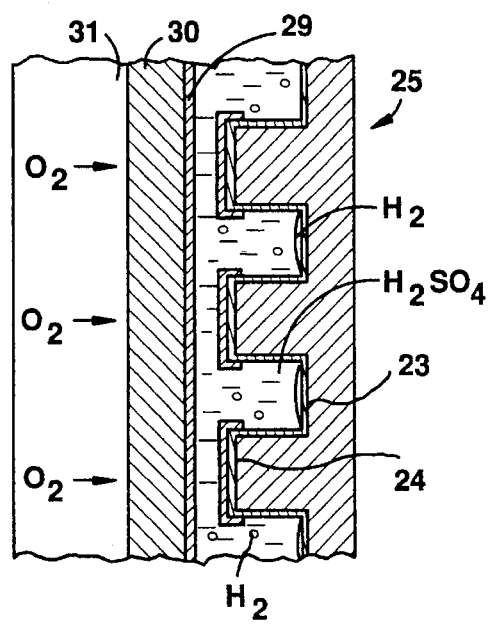
FIG. 11 is a schematic sectional view showing the gas diffusion electrode of FIG. 8 employed in a sulfuric acid-type fuel cell.

In the case of a sulfuric acid-type fuel cell (FIG. 11), a first gas diffusion electrode 31 consisting of a reaction layer 29 and a gas diffusion layer 30, neither having any concave grooves, is located in a gas chamber as an oxygen electrode, and a second gas diffusion electrode 25 which is the same as that of FIG. 8 (a platinum catalyst is supported on reaction layer 29) is located close to first gas diffusion electrode 31 in a liquid chamber as a hydrogen electrode. The oxygen gas in the gas chamber diffuses into the gas diffusion layer 30 of gas diffusion electrode 31 to reach the hydrophobic portions of reaction layer 29, to be reacted by means of the platinum catalyst with sulfuric acid permeated into the hydrophilic portions of reaction layer 29 from the liquid chamber, to generate electricity through electron transfer.

On the other hand, hydrogen gas supplied to the liquid chamber is captured in the hydrophobic apertures of concave grooves 22 of gas diffusion electrode 25 to diffuse into gas diffusion layer 23 to reach the hydrophobic portions of reaction layer 24. The hydrogen gas is reacted by means of the platinum catalyst with sulfuric acid which is permeated into the hydrophilic portions of reaction layer 24 from the liquid chamber, to generate electricity through electron transfer.

In this fuel cell, the sulfuric acid aqueous solution can readily move in the concave grooves 22 of the hydrogen electrode even though the distance between the hydrogen electrode and the oxygen electrode is so small that the heat of the cell can be absorbed by passing the sulfuric acid aqueous solution therethrough, thereby eliminating the necessity for separate cooling means which are used for removing the heat from a conventional fuel cell. Furthermore, the energy efficiency can be increased because the interelectrode distance can be reduced.

Figure 12:
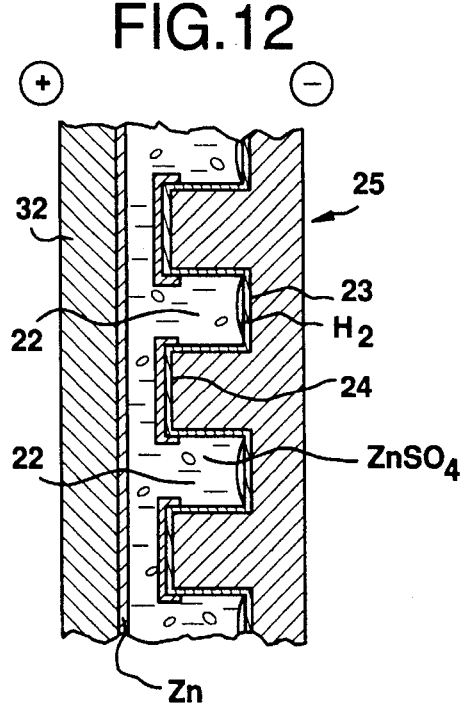
FIG. 12 is a schematic sectional view showing the gas diffusion electrode of FIG. 8 employed in electroplating.

In the case of electroplating (FIG. 12), a substance 32 to be plated and the gas diffusion electrode 25 are located, as a cathode and an anode, respectively, close to each other in an electrolytic cell. When the electrolytic cell is filled with a zing sulfate aqueous solution acidified with sulfuric acid and when hydrogen gas is supplied, concurrent with the supply of electricity to the cell, the zinc sulfate aqueous solution readily moves in the concave grooves 22 of the gas diffusion electrode 25 to supply the zinc ions required for the electroplating, even though the distance between the gas diffusion electrode 25 and substance 32 is small. The hydrogen gas required for the anode reaction is absorbed in the hydrophobic apertures of the gas diffusion layer 23, to reach the hydrophobic apertures of the reaction layer 24 so that the hydrogen gas is oxidized to a H⁺ ion by means of the platinum catalyst. The hydrogen gas, evolved on the cathode as a byproduct at a yield of about 10%, moves into concave grooves 22 and absorbed in the hydrophobic apertures of gas diffusion layer 23 of gas diffusion electrode 25 and can, therefore be saved.

Moreover, in the electroplating process, the electrolyte can readily move in the concave grooves 22 of gas diffusion electrode 25 even though the interelectrode distance is small, such that the electroplating process can be carried out with an increased level of energy efficiency. The electroconductive porous member is preferably hydrophobically treated.

Although in this embodiment, the solution is supplied and discharged together with the gas, the gas may be supplied and discharged at the electroconductive porous member side of the gas diffusion electrode. Further, although in this embodiment, the concave grooves are shown as being parallel to one another, they may be crossed.

Figure 13:
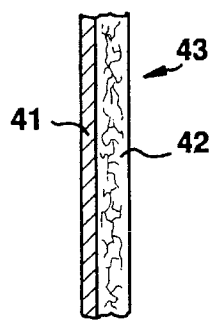
FIG. 13 is a partially enlarged sectional view of a sixth embodiment of the gas diffusion electrode in accordance with the present invention.

FIG. 13 illustrates a sixth embodiment of the gas diffusion electrode of the invention. A reaction layer 41 comprises hydrophilic portions through which a liquid can permeate, and fine hydrophobic portions through which a gas can pass, with both portions being mixed and in contact with each other. The hydrophilic portions contain hydrophilic carbon black, hydrophobic carbon black and PTFE, and the hydrophobic portions contain hydrophobic carbon black and PTFE. An electroconductive large-aperture member 42 having partial fine hydrophobic portions through which a gas can pass, is attached to reaction layer 41 to constitute a gas diffusion electrode 43.

Reaction layer 41, of gas diffusion electrode 43 having this structure, may possess a catalyst such as a platinum group metal, metal oxide or metal alloy supported thereon.

Figure 14:
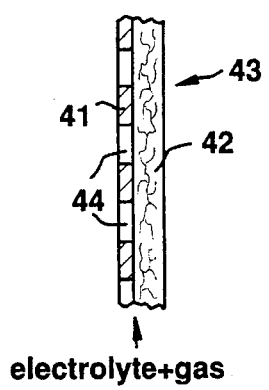
FIG. 14 is a partially enlarged sectional view of a seventh embodiment of the gas diffusion electrode in accordance with the present invention.

A plurality of circular apertures 44 may be provided through reaction layer 41 of gas diffusion electrode 43 in the form of a zigzag as shown in FIG. 14.

Figure 15:
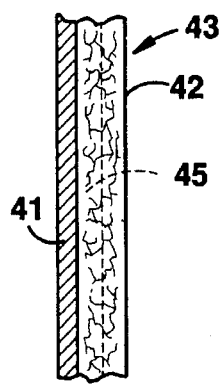
FIG. 15 is a partially enlarged sectional view of an eighth embodiment of the gas diffusion electrode in accordance with the present invention.

One or more angular grooves 45 may be vertically provided in member 42 of electrode 43 as shown in FIG. 15.

In this embodiment, although the electroconductive large-aperture member is made of metal foam, and the fine hydro-phobic portions consisting of hydrophobic carbon black and PTFE are formed in part of electrode 23, the metal foam may be replaced with porous graphite or a metal mesh.

A typical process of employing these gas diffusion electrodes will now be described referring to the gas diffusion electrode 43 of FIG. 13 (a platinum catalyst is supported on reaction layer 41.

Figure 16:
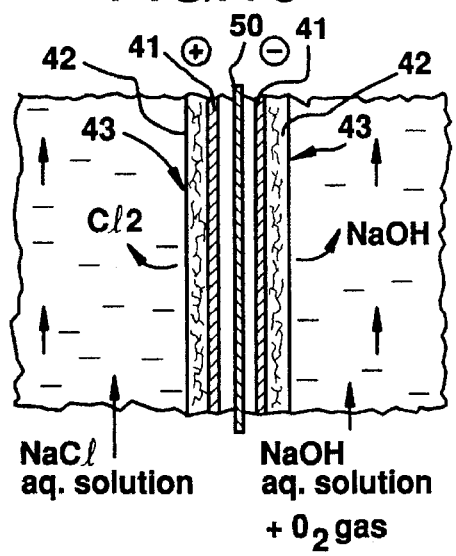
FIG. 16 is a schematic sectional view showing the gas diffusion electrode of FIG. 13 employed in electrolysis.

In the case of electrolysis, a cation exchange membrane 50 is installed between and close to the two gas diffusion electrodes 43 employed as an anode and a cathode as shown in FIG. 16. When a sodium chloride aqueous solution and a hydrogen gas are supplied to the anode chamber and a sodium hydroxide aqueous solution and an oxygen gas are supplied to the cathode chamber, chlorine gas is discharged from the hydrophobic portions of the rear side of the electroconductive large-aperture member 42 oxygen gas is captured in the hydrophobic portions of member 42 which is a rear side of the anode, to readily move to reaction layer 41 and sodium ions pass through member 42 and permeate reaction layer 41 and cation exchange membrane 50. The sodium ions react with hydroxyl ions to produce sodium hydroxide which moves to the electrolyte side through reaction layer 41 and member 42. Since the reaction proceeds in this manner, a large volume of the electrolyte and the gases can flow to facilitate the mass transfer even though the interelectrode distance is small. In addition, since member 42 possesses an excellent electroconductive friction, the electrolysis can be conducted to significantly elevate the energy efficiency.

Figure 17:
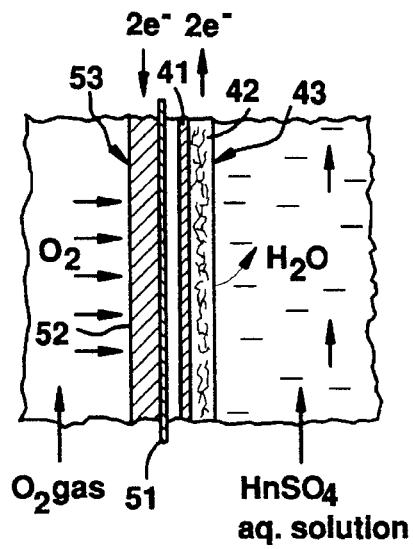
FIG. 17 is a schematic sectional view showing the gas diffusion electrode of FIG. 13 employed in a sulfuric acid-type fuel cell.

In the case of a sulfuric acid-type of fuel cell (FIG. 17), a conventional gas diffusion electrode 53, consisting of reaction layer 51 and a gas diffusion layer 52, is located in a gas chamber as an oxygen electrode, and gas diffusion electrode 43 which is the same as that of FIG. 15 (a platinum catalyst is supported on reaction layer 41) is located close to electrode 53, in a liquid chamber, as a hydrogen electrode. The oxygen gas in the gas chamber diffuses into gas diffusion layer 52 to reach the hydrophobic portions of reaction layer 41 to be reacted by means of the platinum catalyst with sulfuric acid which is permeated into the hydrophilic portions of reaction layer 41 from the liquid chamber to generate electricity through electron transfer.

On the other hand, the hydrogen gas supplied to the liquid chamber is captured in the hydrophobic portions of member 42 (porous carbon treated with PTFE or coated with a mixture of carbon and PTFE) of electrode 43 to move to the hydrophobic portions of reaction layer 41. The hydrogen gas is reacted by means of the platinum catalyst with sulfuric acid permeated into the hydrophilic portions of reaction layer 41 to generate electricity through electron transfer.

Also, in this fuel cell, the sulfuric acid aqueous solution can readily pass to the rear side of the hydrogen electrode, even though the distance between the oxygen electrode and the hydrogen electrode is small, such that the heat of the cell can be absorbed by circulating the sulfuric acid aqueous solution, thereby eliminating the necessity for a separate cooling means which is otherwise required for absorbing the heat of a conventional fuel cell. Furthermore, the energy efficiency can be increased because the interelectrode distance can be made smaller and the capacity of the electroconductive large-aperture member for collecting current is excellent.

Figure 18:
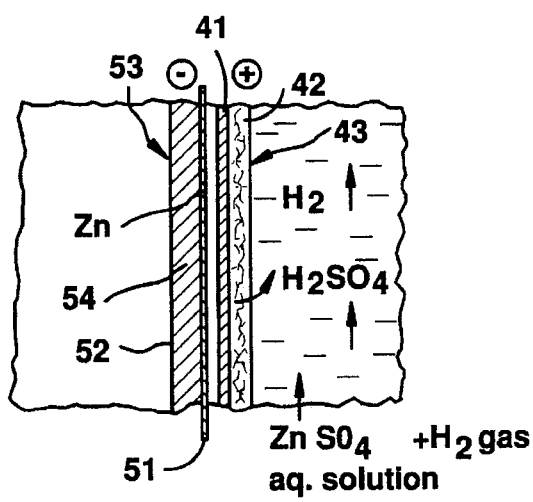
FIG. 18 is a schematic sectional view showing the gas diffusion electrode of FIG. 13 employed in electroplating.

In the case of electroplating (FIG. 18), a substance 54 to be plated and a gas diffusion electrode 43 are located as a cathode and an anode, respectively, close to each other. When an electrolytic cell is filled with a zinc sulfate aqueous solution, and hydrogen gas is supplied concurrent with a supply of electricity to the cell, the zinc sulfate aqueous solution readily moves to the rear side of electrode 43 to pass through the electroconductive large-aperture member 42 (porous lithium electroplated with platinum and treated with PTFE) to be absorbed in the hydrophilic portions of reaction layer 41 even though the distance between electrode 43 and substance 54 is small. The hydrogen gas is absorbed in the hydrophobic portions of the electroconductive large-aperture member to reach the hydrophobic portions of reaction layer 41 to produce sulfuric acid by means of the platinum catalyst. Hydrogen gas is evolved on substance 54 functioning as a cathode, and is absorbed in the hydrophobic portions of reaction layer 41 of gas diffusion electrode 43, and can thus be saved.

Also in the electroplating process, the electrolyte can readily move in the rear side of electrode 53 even though the interelectrode distance is small such that the $Zn^{+2}$ ion can be readily supplied and the electroplating can be carried out at a higher efficiency level. Moreover, the energy efficiency is surprisingly increased due to the excellent current collecting capability of the electroconductive large-aperture member.

Figure 19:
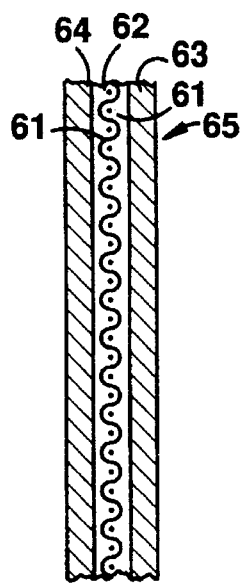
FIG. 19 is a partially enlarged sectional view of a ninth embodiment of the gas diffusion electrode in accordance with the present invention.

FIG. 19 illustrates a further embodiment of this invention. In FIG. 19, the gas diffusion electrode contains a reaction layer 61 comprising fine hydrophilic portions and fine hydrophobic portions and a current collector 62 is located at the center of reaction layer 61. Attached to one surface of reaction layer 61 is an electrical-insulating hydrophilic porous layer 63 and attached to the other surface of reaction layer 61 is an electrical-insulating hydrophobic porous layer 64. Reaction layer 61 consists of hydrophilic carbon black supported with platinum, hydrophobic carbon black and PTFE and is molded in the form of a sheet. Current collector 62 consists of expanded titanium metal plated with titanium. Hydrophilic porous layer 63 may consist of silicon carbide powders and PTFE in the form of a sheet. Hydrophobic porous layer 64 is prepared by spraying PTFE dispersion followed by thermal treatment.

Figure 20:
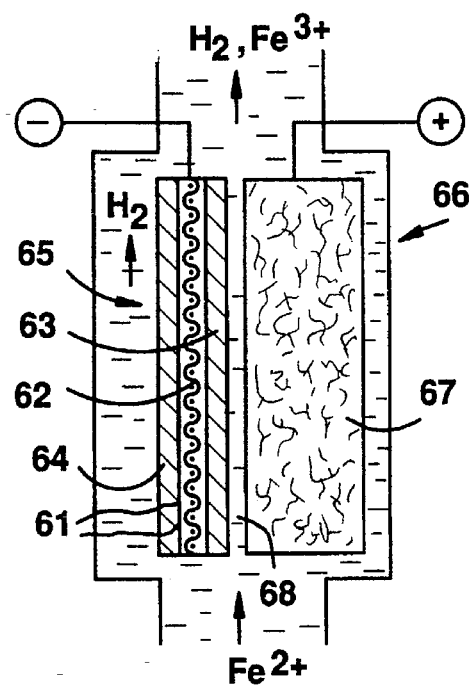
FIG. 20 is a sectional view which illustrates how the gas diffusion electrode of FIG. 19 is employed.

As shown in FIG. 20, gas diffusion electrode 65, present in electrolytic cell 66, contains hydrophilic porous layer 63 disposed opposite dimensionally stable electrode 67. Electrolysis is carried out using electrode 65 as a cathode and electrode 67 as an anode. Electrolyte 68, consisting of a hydrochloric acid solution containing $Fe^{+2}$ and $Fe^{+3}$, is supplied to cell 66 in the direction shown by the arrow. The $Fe^{+2}$ ion is oxidized in the anode side to $Fe^{+3}$. The electrolyte containing the $FE^{+3}$ ion moves only in layer 63 of the cathode side and is not supplied to reaction layer 61. Therefore, the $Fe^{+3}$ ion is never reduced on the cathode. The $H^+$ in electrolyte 68 may move to the cathode side without interruption and may pass through reaction layer 63 and be progressively reduced to hydrogen gas by current collector 62 in the hydrophilic portions of reaction layer 61. The hydrogen gas is evolved from the surface of gas diffusion electrode 65 through hydrophobic porous layer 64 of reaction layer 61.

Figure 21:
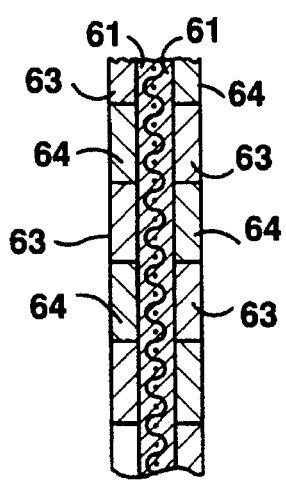
FIG. 21 is a partially enlarged sectional view of a tenth embodiment of the gas diffusion electrode in accordance with the present invention.
Figure 22:
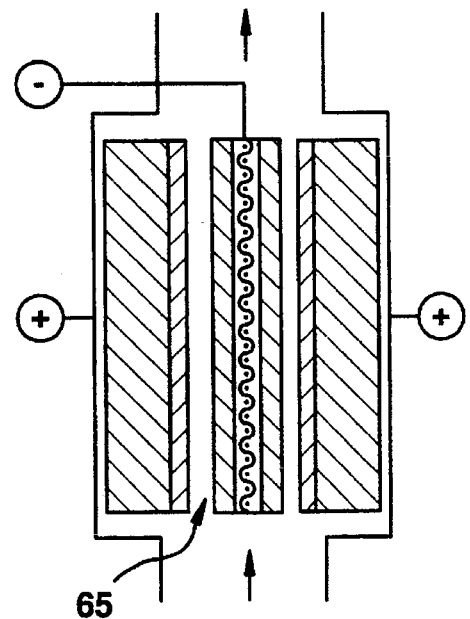
FIG. 22 is a sectional view which further illustrates how the gas diffusion electrode is employed.

Although in the above embodiment, hydrophilic porous layer 63 and hydrophobic porous layer 64 are shown as being attached to the respective surfaces, both layers may be attached alternately to both surfaces as shown in FIG. 21. When layer 63 is attached to one surface of the reaction layer, layer 64 is desirably attached to the corresponding portion of the other surface. The gas diffusion electrode may be disposed between two anodes as shown in FIG. 22.

Bubbling of a hydrogen gas from the lower side of the electrode results in the oxidation of hydrogen and no oxidation of $Fe^{+2}$. Further, this electrode can operate with the following reversible reaction:

The following examples shall serve to illustrate the invention, but shall not be deemed to limit the scope of the invention. The scope of the invention shall be deemed to be limited only in accordance with the claims set forth hereinbelow.

EXAMPLE 1

Figure 23:
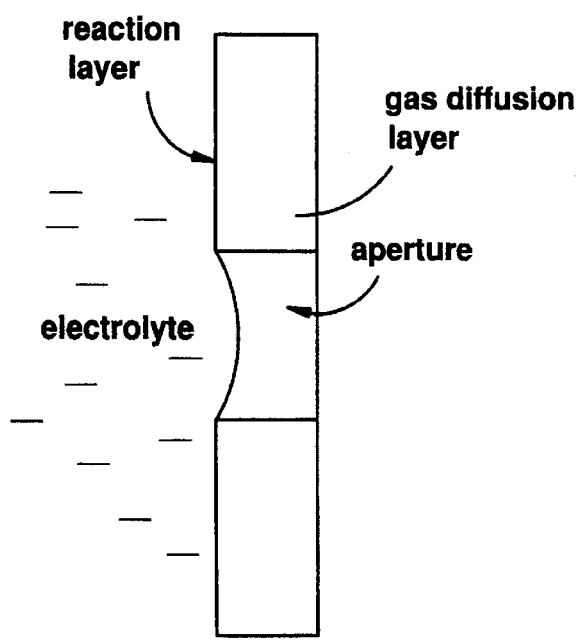
FIG. 23 is a sectional view showing the gas diffusion electrode immersed in an electrolyte.
Figure 24:
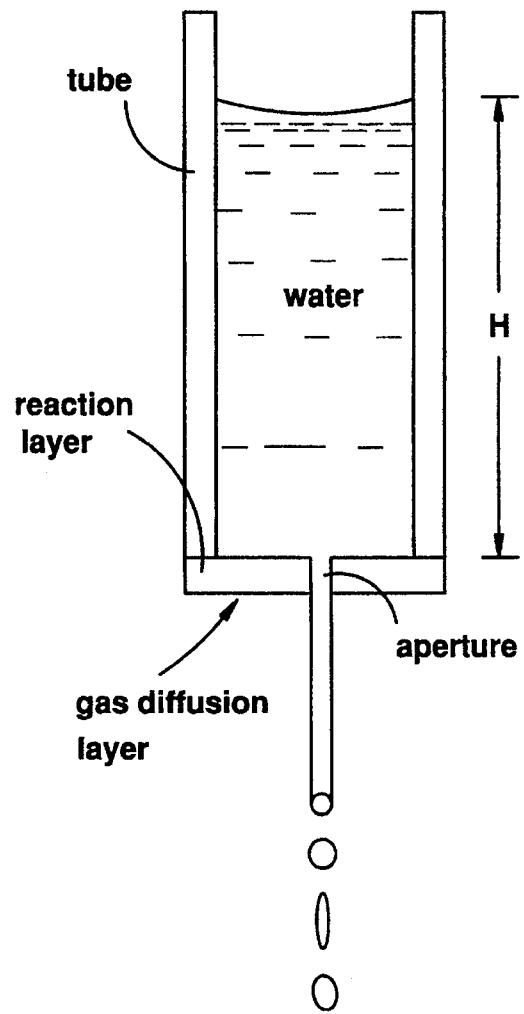
FIG. 24 is a sectional view showing the effect of the aperture diameter upon a flow of water through the gas diffusion electrode of the invention.

Two gas diffusion electrodes were prepared with the structure corresponding to that shown in FIG. 23 both electrodes were identical, except that one electrode had a plurality of apertures with a diameter of 0.5 mm, while the other electrode had a plurality of apertures with a diameter of 2 min. The two electrodes were separately equipped at their lower extremities with tubes prepared from an acrylate resin as shown in FIG. 24. Water was added to the tube and allowed to flow through the aperture until an equilibrium was reached between the weight of water remaining in the tube (corresponding to height H in FIG. B) and the resistance through the aperture. The heights H at the time water ceases flowing through the aperture were 86.0 mm for the electrode having an aperture diameter of 0.5 mm and 7.8 mm for the electrode whose aperture was 2 mm.

EXAMPLE 2

The gas diffusion electrode of FIG. 19 was employed for the conversion of ionic valency in the cell shown in FIG. 20. The reaction layer was prepared by molding the mixture of hydrophilic carbon black having an average particle diameter of 390 Å, hydrophobic carbon black having an average particle diameter of 420 Å, and PTFE powders having an average particle diameter of 0.3 μm in a ratio of 4:3:3 into a sheet having a thickness of 0.1 mm, a width of 100 mm and a length of 100 mm. Platinum catalyst in the amount of 50 mg was supported on the hydrophilic carbon black.

The current collector was an expanded titanium metal having a thickness of 0.2 mm (about 50 mesh) and plated with platinum.

The hydrophilic porous layer was prepared by molding the mixture of silicon carbide powders having an average particle diameter of 0.5 μm and PTFE having an average particle diameter of 0.3 μm in a ratio of 9:1 to a sheet having a thickness of 0.5 mm, a width of 100 mm, a length of 100 mm, a pore rate of 70% and a porosity of not more than 10 μm.

The hydrophobic porous layer was prepared by spraying a PTFE dispersion having an average particle diameter of 0.3 μm to one surface of the reaction layer to form a sheet having a thickness of 0.1 mm, a width of 100 mm and a length of 100 mm, followed by thermal treatment at 320° C. The gas diffusion electrode prepared in this manner was installed in the electrolytic cell, and was disposed such that its hydrophilic porous layer was opposite to the dimensionally stable electrode as shown in FIG. 20. Electrolysis was carried out at a current density of 0.2 A/cm$^2$ while supplying an electrolyte to the cell consisting of a 5M hydrochloric acid solution containing $Fe^{+2}$ and $Fe^{+3}$ ions at concentrations for each ion of 1.5M/liter.

The $Fe^{+2}$ ion was oxidized in the anode side to $Fe^{+3}$ ion which was not reduced on the cathode. The overvoltage of hydrogen evolution was 50 mV and the current efficiency of the hydrogen evolution was 97%.

Comparative Example 2

The same procedures of Example 2 were carried out except that a glass filter film having a thickness of 0.5 mm was formed as the hydrophilic porous layer on one side of the reaction layer and a gas diffusion layer was attached to the other surface in place of the hydrophobic layer.

The overvoltage of hydrogen evolution was 62 mV and the current efficiency of the hydrogen evolution was 68%. The decrease in current efficiency was due to the electroconductivity of the gas diffusion layer which reduced the $Fe^{+3}$ ion.

EXAMPLE 3

Figure 4:
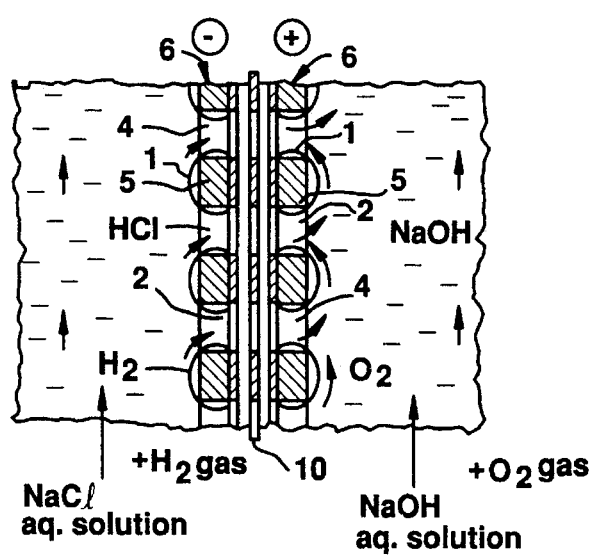
FIG. 4 is a schematic sectional view showing the gas diffusion electrode of FIG. 2 employed in electrolysis.

The gas diffusion electrode of FIG. 2 was employed in the electrolysis of a sodium chloride aqueous solution having a concentration of 270 g/liter in the electrolytic cell shown in FIG. 4. The reaction layer was prepared by molding a mixture of hydrophilic carbon black (AB-11, made by Denki Kagaku Kogyo K.K.), hydrophobic acetylene black (AB-7, made by Denki Kagaku Kogyo K.K.) and PTFE powder (D-1, made by Daikin Kogyo K.K.) in the ratio of 6:4. Circular apertures having a diameter of 2 mm were pretreated through the reaction layer and the gas diffusion layer.

The distances between the cation exchange membrane and the two electrodes were set at 1 mm. Hydrogen and oxygen gases were supplied as shown in FIG. 4, and the electrolysis was carried out at a current density of 30 A/dm$^2$. The cell voltage was 2.2 V and the current efficiency was 97%.

Comparative Example 3

The same procedures of Example 3 were carried out except that the circular apertures were not perforated. The distances between the cation exchange membrane and the two electrodes could not be maintained at less than 4 mm. The cell voltage was 2.4 V which was greater by an amount of 0.2 V than that of Example 3, and the current efficiency was 95%, which was lower by an amount of 2% than that of Example 3.

EXAMPLE 4

Figure 10:
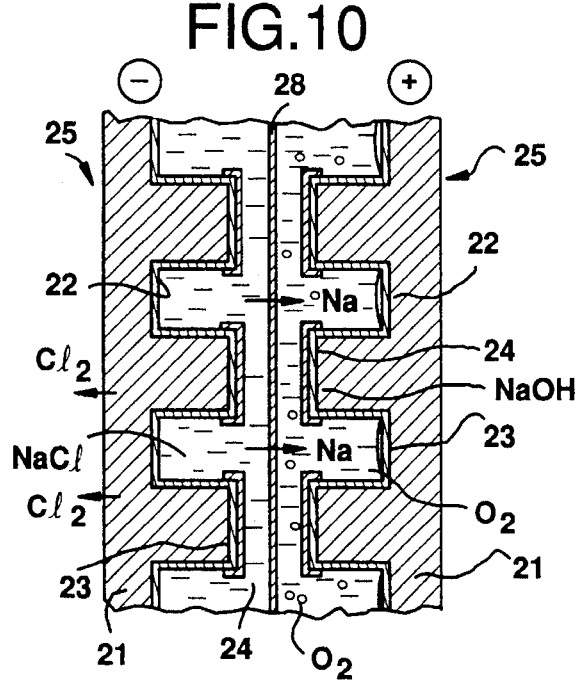
FIG. 10 is a schematic sectional view showing the gas diffusion electrode of FIG. 8 employed in electrolysis.

The gas diffusion electrode of FIG. 8 was employed in the electrolysis of a sodium chloride aqueous solution having a concentration of 260 g/liter in the electrolytic cell shown in FIG. 10. The reaction layer and the gas diffusion layer were prepared by the same procedures as set forth in Example 3. The width and depth of the concave grooves were 3 mm.

The distances between the cation exchange membrane and the two electrodes were set at 0.5 mm. As oxygen gas was supplied as shown in FIG. 10, the electrolysis was carried out at a current density of 30 A/dm$^2$. The cell voltage was 2.16 V and the current efficiency was 97%.

Comparative Example 4

The same procedures employed in Example 4 were carried out except that the circular apertures were not pretreated. The distances between the cation exchange membrane and the two electrodes could not be maintained at less than 4 min. The cell voltage was 2.4 V which was greater by an amount of 0.2 V than that of Example 4, and the current efficiency was 95%, which was lower by an amount of 2% than that of Example 4.

EXAMPLE 5

The gas diffusion electrode of FIG. 13 was employed in the electrolysis of a sodium chloride aqueous solution in the electrolytic cell shown in FIG. 16. The reaction layer and the gas diffusion layer were prepared by the same procedures of those of Example 3. The aperture diameters of the large aperture-member were between 0.2 and 1.2 mm. The distances between the cation exchange membrane and the two electrodes were set at 0 mm, that is, they were in contact with each other. The cell voltage was 2.14 V and the current efficiency was 97%.

Comparative Example 5

The same procedures employed in Example 5 were carried out except that the large-aperture member was not used. The distances between the cation exchange membrane and the two electrodes could not be maintained at less than 4 mm. The cell voltage was 2.4 V which was greater by an amount of 0.2 V than that of Example 5, and the current efficiency was 95%, which was lower by an amount of 2% than that of Example 5.

What is claimed is:

1. A gas diffusion electrode comprising a reaction layer and a gas diffusion layer attached to each other and containing a plurality of concave-convex surfaces present on the electrode, said surfaces facilitating the flow of a gas and/or a fluid electrolyte, when the electrode is immersed in said electrolyte.

2. The electrode of claim 1, wherein a catalyst is supported on the reaction layer.

3. The electrode of claim 1, wherein a current collector is joined to or embedded in the electrode.

4. The electrode of claim 1, wherein a porous member comprised of a fluorine-containing resin is attached to a part of the electrode.

5. The electrode of claim 1, wherein the gas diffusion layer contains fine hydrophobic apertures through which a gas can pass and comprises two surfaces, wherein one of the two surfaces is attached to an entire surface of one side of an electroconductive porous member forming a plurality of concave-convex portions, and the other or part of the other of the two surfaces is attached to a reaction layer containing fine hydrophilic apertures through which a liquid permeates and fine hydrophobic apertures through which a gas passes, other than the convex portions of the gas diffusion layer.

6. The gas diffusion electrode of claim 1 further comprising:

a) a reaction layer formed by portions of hydrophilic material through which a liquid can permeate and portions of fine hydrophobic material through which a gas passes, said portions being mixed and in contact with each other;

b) a current collector located in the reaction layer; and c) an electrical-insulating hydrophilic porous layer and an electric insulating hydrophobic porous layer attached to both surfaces of the reaction layer.

7. An electrolytic cell comprising two electrodes of claim 1 with a cation exchange membrane located between the two electrodes, and wherein the distance between the membrane and each of the electrodes ranges from 0 to 4 mm.

8. A fuel cell comprising the electrode of claim 1, a second gas diffusion electrode and a separation element therebetween, wherein the distance between the separation element and each of the respective gas diffusion electrodes ranges from 0 to 4 mm.

9. A plating cell comprising the electrode of claim 1.

* * * * *